April 19, 1955   D. M. JOHNSON ET AL   2,706,349
SALES EXHIBITING APPARATUS
Filed Sept. 28, 1951   4 Sheets-Sheet 1

FIG. 1

FIG. 2

INVENTORS
D. M. JOHNSON
G. M. WALTON
BY
*A. Yates Dowell*
ATTORNEY

April 19, 1955    D. M. JOHNSON ET AL    2,706,349
SALES EXHIBITING APPARATUS
Filed Sept. 28, 1951    4 Sheets-Sheet 2

FIG. 3

26  25  19

NO. _____ STOCK _____
MAKE _____
MODEL _____
YEAR _____
STYLE _____
PRICE _____
ACC. _____

STICK ON WINDSHIELD

NEW CAR INVENTORY — SALESMAN _____
STOCK NUMBER _____
DATE RECEIVED _____ DATE SOLD _____
MAKE _____ YEAR _____ MODEL _____ SERIES _____
BODY STYLE _____ COLOR _____ PRICE _____
MOTOR NUMBER _____ SERIAL NUMBER _____
INVOICE NO. _____
ACCESSORIES _____

ADDITIONAL INFORMATION ON BACK

FIG. 4

19   25  26

FILE FOR FUTURE PROSPECT
SOLD TO _____
ADDRESS _____
CITY _____
TRADED IN _____ STOCK NO. _____ PRICE _____
CASH $ _____ CONTRACT $ _____ FOR _____ MONTHS AT
_____ PER MONTH. FUTURE CONTACT TIME _____
CONTACTS: _____

FIG. 5

29  28  27

NO. _____ STOCK _____
MAKE _____
MODEL _____
YEAR _____
STYLE _____
PRICE _____
ACC. _____

STICK ON WINDSHIELD

USED CAR INVENTORY — SOLD BY _____
STOCK NO. _____
MAKE _____ YEAR _____ BODY STYLE _____ SERIES _____
COLOR _____ ACCESSORIES _____
MOTOR NO. _____ SERIAL NO. _____
DATE IN _____ APPRAISER _____ SALESMAN IN: _____ PRICE _____
DATE IN _____ REPAIRS _____ | R.O. NO. | TOTAL |
DATE IN _____ PRICE _____ | R.O. NO. | TOTAL |

ADDITIONAL INFORMATION ON BACK

FIG. 6

27   28  29

FILE FOR FUTURE PROSPECT
FORMER OWNER _____
MILEAGE _____
SOLD TO _____
ADDRESS _____
CITY _____
CASH $ _____ CONTRACT $ _____ FOR _____ MONTHS AT
_____ PER MONTH. FUTURE CONTACT TIME _____
CONTACTS: _____

INVENTORS
D. M. JOHNSON
G. M. WALTON
BY
A. Yates Dowell
ATTORNEY

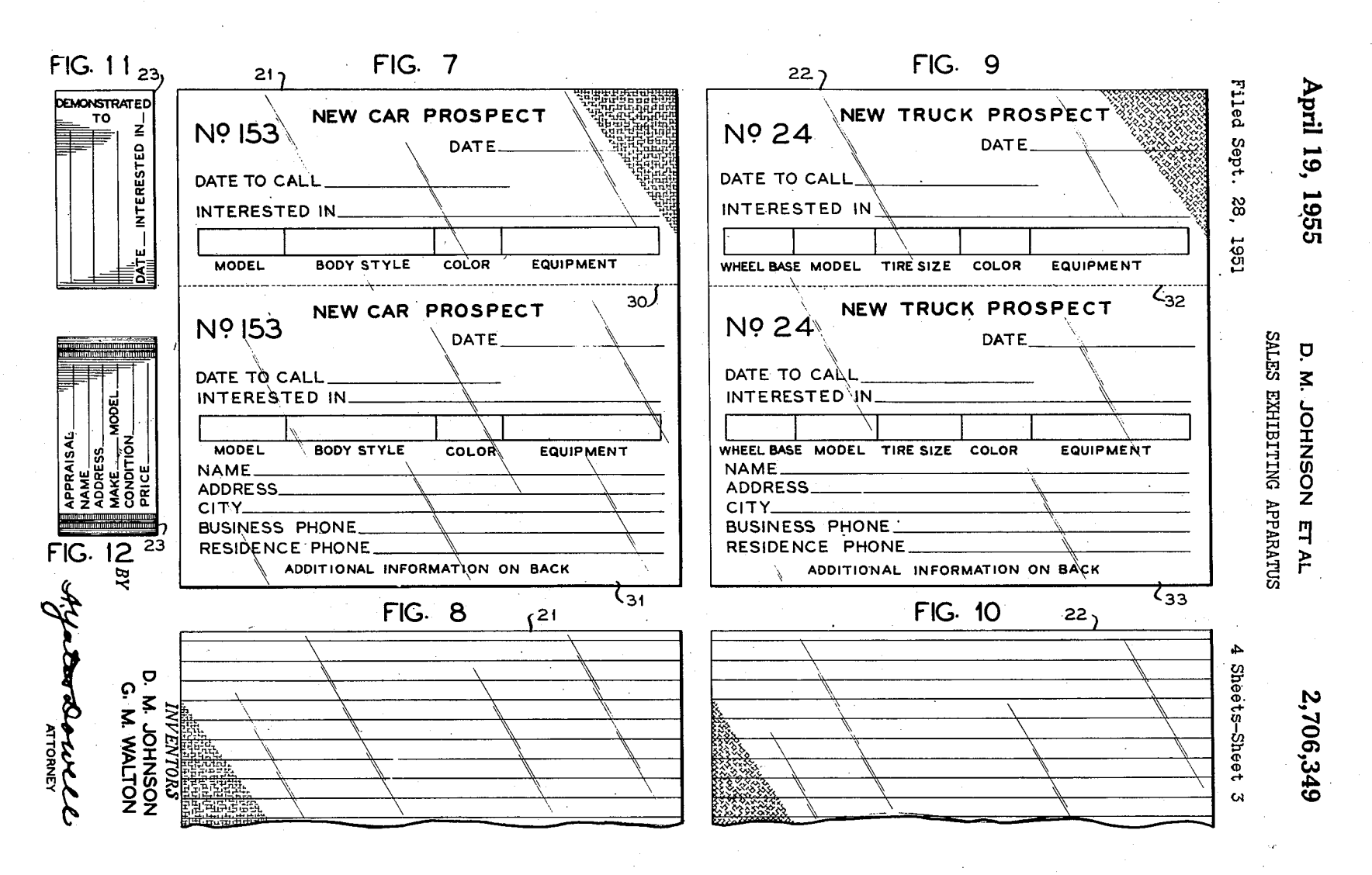

April 19, 1955  D. M. JOHNSON ET AL  2,706,349
SALES EXHIBITING APPARATUS
Filed Sept. 28, 1951  4 Sheets-Sheet 3

INVENTORS
D. M. JOHNSON
G. M. WALTON
BY A. Yates Dowell
ATTORNEY

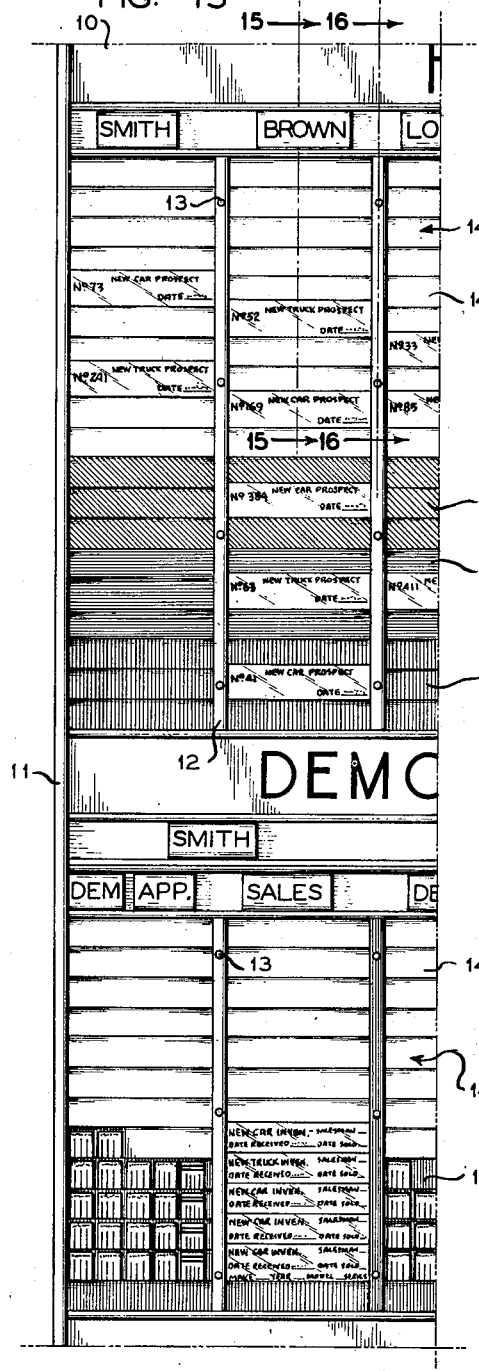
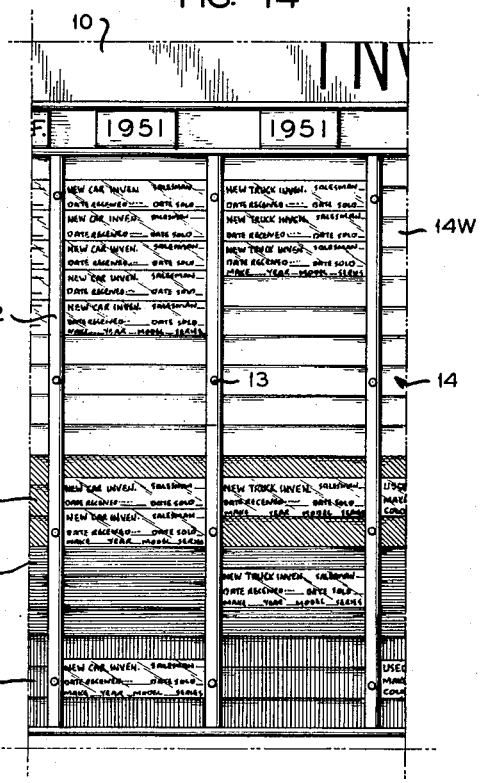
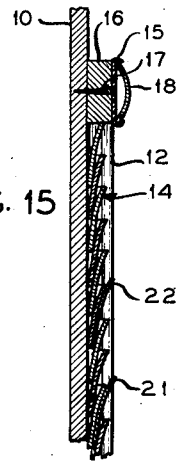
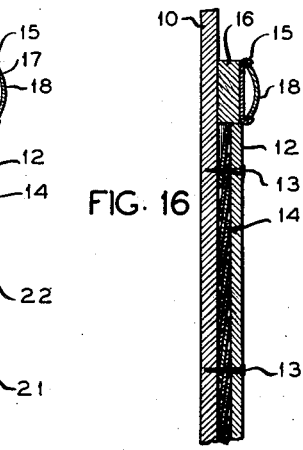
*INVENTORS*
D. M. JOHNSON
G. M. WALTON
BY
ATTORNEY

United States Patent Office 2,706,349
Patented Apr. 19, 1955

2,706,349

SALES EXHIBITING APPARATUS

Darrell M. Johnson and George M. Walton, Thomson, Ga., assignors to The Laudar Company, Thomson, Ga., a corporation of Georgia Application September 28, 1951, Serial No. 248,815

3 Claims. (Cl. 35—24)

This invention relates to merchandising, and more particularly to the sale of automobiles and the like, and the conduct of an operation of this character in a manner to simplify selling, to increase sales, and to reduce overhead, including the time involved in keeping the necessary records.

In large sales operations usually there is much lost motion and inefficiency with consequent reduction of profit and increase in operating costs, and the quality of a profitable operation, as well as the making of an unfavorable impression on purchasers.

It is an object of the invention to provide equipment and instructions for use of the same by means of which new and used automobiles or other commodities may be profitably and most satisfactorily to all parties merchandised with minimum personnel, effort, time consumption, and consequent maximum efficiency, as well as to portray a constant knowledge of transactions.

Another object of the invention is to provide equipment by the use of which knowledge of conditions may be understood and maintained at a glance, including that of sales, inventories, prospects, demonstrations, and appraisals, as well as anticipated special receipts of cars and equipment.

A further object of the invention is to provide current display apparatus indicating sales, inventory or stock on hand, and contemplated prospects of sales, demonstrations relative to sales efforts, and appraisals, by means of which the management in the conduct of the business may at all times be alert to what is transpiring and thereby be in a position to correct any difficulty or interference with the smooth satisfactory operation of the business.

A further object of the invention is to change what might be a laborious operation to one in which laboriousness is minimized if not removed, so that what might ordinarily be considered work becomes, by the introduction of interest, competitive spirit and enjoyment into the enterprise, a pleasurable undertaking.

Other objects and the nature and advantages of the invention will be apparent from the following description taken in conjunction with the accompanying drawings, wherein:

Fig. 1 is a front elevation of a display unit illustrating one application of the invention;

Fig. 2 a top plan view;

Fig. 3 a front elevation of a new car inventory card;

Fig. 4 a rear elevation of the card of Fig. 3;

Fig. 5 a front elevation of a used car inventory card;

Fig. 6 a rear elevation of the card of Fig. 5;

Fig. 7 a front elevation of a new car prospect card;

Fig. 8 a fragmentary rear elevation of the card of Fig. 7;

Fig. 9 a front elevation of new truck prospect card;

Fig. 10 a fragmentary rear elevation of the card of Fig. 9;

Fig. 11 a front elevation of a demonstration card;

Fig. 12 a rear elevation of the card of Fig. 11 but having information for appraisal thereon;

Fig. 13 a fragmentary enlarged front elevation of the device of Fig. 1 illustrating the sales, prospects, demonstrations and appraisals sections in use;

Fig. 14 a fragmentary enlarged front elevation of the device of Fig. 1, inventory of stock on hand or contemplated, in use;

Fig. 15 a fragmentary detail section on the line 15—15 of Fig. 13; and

Fig. 16 a fragmentary detail section on the line 16—16 of Fig. 13.

With continued reference to the drawings there is shown in Fig. 1 a display unit illustrative of the invention. This unit may be of any desired construction, including readily available materials and for purposes of illustration it includes a base or foundation panel 10 of any desired material, such as for example, wood, plywood, or the like, and of any desired configuration appropriate to the artistic aesthetic taste of the individual. For convenience, the base panel is illustrated as of substantially rectangular shape and may have an edge molding 11 to improve its appearance and protect its edges, and additionally this molding is preferably given a protective sheet or coating of paint, metal, plastic, or other desired substance. As illustrated, the panel may be divided into a plurality of columns by ribs 12 of any desired thickness attached by nails, screws or other desired fasteners, 13 to the front surface thereof and in a manner of project outwardly any desired distance therefrom.

In order to support a plurality of cards, there are provided display strips or slats 14 illustrated in detail in Figs. 15 and 16. These slats are of concavo-convex formation and preferably are formed of resilient metal, plastic or other material similar to that employed in conventional Venetian blinds. These strips may be of any desired length corresponding to requirements and the dimensions of the foundation panel. The rack may be economically constructed by detaching strips from an endless length of stock.

As illustrated, particularly in Figs. 15 and 16, the strips 14 are arranged in parallel overlapping relation with their convex sides disposed rearwardly adjacent to the face of the foundation panel 10. These strips are held in position by the ribs 12 so that the lower edge of a strip is located behind and in substantial contact with the mid-position of the next lower strip so that a card inserted between the strips will be frictionally held. By adjusting the fastening elements 13 in the ribs 12 the amount of tension between the strips or slats can be varied to suit.

At the top of the columns formed by the ribs 12 is a horizontal or transverse subject column including a channel member 15 on a mounting strip 16, held in position by means of fastening elements such as screws or the like 17, such channel members being adapted to receive subject or name retaining strips 18. With the structure illustrated the board is adapted to receive appropriate record cards suitably arranged so that with minimum inspection the overall situation relative to the complete operations is readily apparent.

For most satisfactory operation it is desirable to move the stock on hand as soon as possible and in the upper half of the board both prospects and inventories are desigated as well as cars ordered on preference. The upper portion of the structure has indicating columns of sales prospects with the names of salesmen at the top of the sales column, and the columns of inventories carry the year of the car at the top of the columns extending from left to right and beginning with 1951. Between the prospects and inventories portions of such upper portion is a column headed by the words or indicia, meaning cars expected in accordance with particular arrangement or on preference.

The strips or slats are colored white, green, blue and red, the white strips $14^w$ of which any desired number may be employed, as for example ten, indicating the normal time in which the stock should be sold. Thereafter there are a brief series of green strips or slats $14^g$, followed by a similar number of blue strips or slats $14^b$, followed in turn by a similar number of red strips $14^r$. The green, blue, and red strips or slats indicate similar shorter periods in which sales effort is increased until in the last series of red strips or slats it is within the danger zone or zone in which loss in the item is approaching certainty unless the sale is made. In the sale of automobiles there may be ten of the white strips or slats $14^w$ indicating ten days, a normal period in which an automobile is supposed to be sold. The green slats $14^g$ may be three in number, representing from the eleventh to the twentieth days or a time period equal to that represented by the white slats or approximately ten days. The blue strips or slats 14$^b$ represent from the twenty-first to the thirtieth day, a time period of similar length, and the red strips or slats 14$^r$ represent from the thirty-first to the sixtieth day or any other desired period after which the particular item is indicated as substantially worthless.

The lower portion of the board is utilized for displaying the record of the activities of individual salesmen. The name of the salesmen are disposed along the top of the lower portion of the board over two vertical columns, the first being divided into demonstrations and appraisals and the second column being designated to indicate sales. Since a number of sales are necessary before net profit can be had, cards indicating sales are placed in the pockets between the slats beginning with the lower pocket and successively the next lower until four of such pockets formed consequently by five red strips or slats 14$^r$ are filled. The next or fifth sale will be out of the red in the white section, so that, in order for a salesman to meet quota he must make four sales, and if he is to beat the quota or get "out of the red" he must make five sales or more.

Any number of cards indicating demonstrations and appraisals may be used, however, only four sales can form a foundation for profitable additional sales and such additional sales may be indicated in the pockets formed in the slats 14$^w$.

A series of cards are employed for use with the board just described. These cards are new car inventory, used car inventory, new car prospect and new truck prospect, demonstration and appraisal card. These cards are distinctively colored, the new car inventory card 19 being yellow, the used car inventory card 20 being red, the new car prospect card 21 being yellow, the new truck prospect card 22 being red, and the demonstration and appraisal card 23 being blue but with the appraisal side having red marginal stripes at its opposite ends.

As soon as a new car is received the data relative to the same is recorded on the New Car Inventory card 19 having indicia relative to the salesman, the stock number, date received, date sold, make, year, model, series, body style, color, price, motor number, serial number, invoice number, and accessories. This New Car Inventory card 19 has a weakened line 25 to provide a stub 26 having indicia thereon designating the number, stock, make, model, year, style, price, and accessories, as well as instructions to stick it on the windshield. On the back of the New Car Inventory card 19 there is provided indicia sufficient to form a file for future prospects, including information relative to a purchaser, his street address, his city, whether there was a trade-in, the stock number, price, the amount of cash involved in the transaction, the contract, period of time, payments per month, future contact time or date, and recommendations for other sales prospects.

When a used car is received either by purchase or trade-in, the data is recorded on a Used Car Inventory card 27. This card has indicia indicating the recording of by whom sold, the stock number, make, year, body style, series, color, accessories, motor number, serial number, date in, appraiser, salesman in, price, date ready, repairs, date out, price, and reconditioning orders written. This Used Car Inventory card is also provided with a weakened line 28 providing a stub 29 having indicia thereon relative to the number, stock, make, model, year, style, price, and accessories, if any, as well as instructions to stick it on the windshield.

On the back of Used Car Inventory card 27 is information relative to a file for future prospects with indicia for receiving information relative to the former owner, mileage, to whom sold, street address, city, cash involved, the contract, period of time, amount per month, future contact time or date, and who should be contacted.

As soon as a new car is received necessary information relative to the same is entered on the New Car Inventory card 19 and this card is placed in one of the columns 14 on the display board under the New Car section, the column headed 1951, and in the white section of such column. The card is kept in the white section for ten days, during which time efforts are made to sell the same in the usual manner, and if the car is not sold during this period the card is moved downwardly into the green section, where it is permitted to remain for an additional ten days while sales efforts continue. If, for some reason, the new car is not sold at the end of this period, the card is moved down into the blue section where it is permitted to remain a maximum of ten days, at the end of which time the car will have been on hand approximately thirty days. If still unsold, the card is then moved into the red section indicating the necessity for giving the sale of the same priority.

The Used Car Inventory card 27 is used in like manner, by inserting the same in the white section in the proper year column.

The New Car Prospect card 21 is provided with a weakened line 30 providing an additional portion 31, the first portion 21 being for use in the display board and the second portion 31 being adapted to be placed in a card file for use by salesmen or others. The portion 21 of the New Car Prospect card 21 contains indicia relative to the number of the card, the date, date to call, and the type of automobile in which the prospect is interested. It also contains indicia relative to model, body style, color, and equipment. The portion 31 of the New Car Prospect card contains similar information but in addition the name, street address, city, business phone and residence phone are designated. The back of the first portion 21 and the portion 31 of the New Car Prospect card are lined to receive additional names or other data.

A New Truck Prospect card 22 is provided with a weakened line 32 to divide the card into a second portion 33 suitable for card filing. This New Truck Prospect card is similar to the New Car Prospect card and contains information of the same nature.

A demonstration card 23 carries information relative to the date of the demonstration and the type of car in which the prospect is intersted as well as lines for other information such as the prospect's name and address. On the back of this card are blanks and indicia indicating that such blanks are for receipt of information relative to the appraisal, name, address, city, make, model, and price of a particular automobile. The demonstration card is adapted to be placed on the display board. On the back of the demonstration card the edges are provided with red strips as previously indicated.

When a customer is contacted and expresses an interest in a particular car the information is recorded on the New Car Prospect card 31 which is then placed in the Prospect Card File and the upper portion 21 is detached and placed under New Car Prospects on the display board beneath the salesman's name in the white section of the particular column as previously described.

A comparison is made between the customer's desire indicated on the Prospect Card and with the Inventory cards 19 placed in the Inventory section of the display board. If there is an automobile in stock that corresponds to the requirements of the prospect it or one similar to it is demonstrated to the prospect.

Upon completion of the demonstration the salesman making such demonstration will fill out a demonstration card 23 and place said card appropriately in the demonstration column beneath his name. In the event that the prospect has a used car which he desires to trade for a new one, the salesman will see that an appraisal of said car is made and so indicate on the demonstration card which is then reversed and placed in the demonstration column with the red strips in view, indicating that an appraisal was made on the prospect's automobile as well as a demonstration.

As mentioned previously, the prospect card is to be placed in the upper or white section beneath the salesman's name. In the event that a ten days' period has elapsed and a sale has not been made, the card is next moved to the next lower section which is green, which indicates that he has been a prospect for from ten to twenty days and so forth, down on into the red and blue sections, the indications being the same as described in the Inventory section. A similar procedure is followed in the use of a New Truck Prospect card.

From the foregoing it will be understood that there is provided sales apparatus or equipment and method or system of using the same by means of which each part of the selling organization or operation, including stock or inventory, sales prospects, demonstrations, appraisals, and sales are organized so that the status of the entire operation, including the work of each salesman, the cars on hand, the year manufactured and the length of time said cars have been on hand is kept readily apparent. The sales manager may see at a glance from the "On Pref"

column how many automobiles will be received from the factory with special equipment or accessories thereon. This applies not only to new passenger automobiles but to trucks as well.

It will also be understood that in a smooth operation other valuable information will be evident. For example, there is a definite relation between demonstrations, appraisals, and sales, and where there are comparatively few demonstrations and appraisals it will be an indication that the price is offered too quickly or it is not what it should be. Thus, abnormal situations may be observed and corrected.

What is claimed is:

1. Sales and exhibiting apparatus comprising a base, a series of pocket forming slats mounted on said base, vertical column forming strips overlying said slats and adjustably mounted on said base; for variably pressing said slats together under tension to receive cards to be frictionally held between said slats, division members dividing said slats into a multiplicity of horizontal sections, removable name plates for said columns carried by said division members, a portion of said slats having one color and adjacent portions having additional colors for holding record-bearing cards indicating different age groups or intervals of time, said columns and horizontal divisions providing display apparatus relative to the individual operations which combine to form the complete activities for receiving appropriate indica-bearing cards directed to the specific operations, and providing ready indication of the situation in overall and individual operations, certain of said cards having characteristics similar to the characteristics of said slats to distinguish said cards and the items represented.

2. The invention according to claim 1 wherein the individual slats are of resilient construction which permits adjustment of the tension thereon by said strips.

3. The invention according to claim 1 wherein the individual slats are of concavo-convex flexible construction which permits adjustment of the tension thereon by said strips.

References Cited in the file of this patent

UNITED STATES PATENTS

| | | |
|---|---|---|
| 1,711,981 | Andres | May 7, 1929 |
| 2,234,249 | Hanford | Mar. 11, 1941 |
| 2,419,631 | Curtenius | Apr. 29, 1947 |

FOREIGN PATENTS

| | | |
|---|---|---|
| 373,281 | Italy | July 24, 1939 |
| 863,509 | France | Jan. 2, 1941 |
| 646,039 | Great Britain | Nov. 15, 1950 |